US 12,246,717 B2

(12) United States Patent
Elkins (10) Patent No.: US 12,246,717 B2
(45) Date of Patent: Mar. 11, 2025

(54) SYSTEMS AND METHODS FOR RE-STARTING ENGINE DURING COASTING EVENT

(71) Applicant: Cummins Inc., Columbus, IN (US)

(72) Inventor: David Michael Elkins, Columbus, IN (US)

(73) Assignee: Cummins Inc., Columbus, IN (US)

( * ) Notice: Subject to any disclaimer, the term of this patent is extended or adjusted under 35 U.S.C. 154(b) by 211 days.

(21) Appl. No.: 17/818,401

(22) Filed: Aug. 9, 2022

(65) Prior Publication Data

US 2023/0080451 A1    Mar. 16, 2023

Related U.S. Application Data (60) Provisional application No. 63/242,747, filed on Sep. 10, 2021.

(51) Int. Cl.
*B60W 30/18* (2012.01)
*B60W 10/02* (2006.01)
*B60W 10/06* (2006.01)

(52) U.S. Cl.
CPC ...... *B60W 30/18072* (2013.01); *B60W 10/02* (2013.01); *B60W 10/06* (2013.01); *B60W 2510/0208* (2013.01); *B60W 2510/0638* (2013.01); *B60W 2710/0627* (2013.01); *B60W 2710/0644* (2013.01)

(58) Field of Classification Search
None
See application file for complete search history.

(56) References Cited

U.S. PATENT DOCUMENTS

| | | | |
|---|---|---|---|
| 6,951,525 B2 | 10/2005 | Ries-Mueller | |
| 8,401,768 B2 | 3/2013 | Lewis et al. | |
| 8,612,108 B2 * | 12/2013 | Polimeno | B60W 10/182 701/68 |
| 8,771,147 B2 * | 7/2014 | Yamada | B60W 10/026 477/176 |
| 8,840,525 B2 * | 9/2014 | Enoki | B60W 10/06 477/77 |
| 8,932,182 B2 * | 1/2015 | Tatewaki | B60W 10/107 477/135 |
| 9,242,649 B2 * | 1/2016 | Kim | F16D 48/06 |
| 9,327,707 B2 * | 5/2016 | Hawkins | B60W 10/08 |
| 9,333,974 B1 * | 5/2016 | Gibson | B60W 10/06 |
| 9,656,676 B2 * | 5/2017 | Mitsuyasu | B60W 10/06 |
| 9,920,731 B2 * | 3/2018 | Lee | F02N 11/0803 |
| 10,081,360 B2 * | 9/2018 | Hu | G06V 20/56 |
| 10,099,675 B2 * | 10/2018 | Shafto | F16H 61/00 |
| 10,449,964 B2 * | 10/2019 | Iwamoto | F02D 17/00 |
| 10,479,359 B2 * | 11/2019 | Ose | B60W 10/10 |

(Continued)

FOREIGN PATENT DOCUMENTS

| | | |
|---|---|---|
| DE | 102013205010 A1 | 9/2014 |
| WO | 2017016560 A1 | 2/2017 |
| WO | 2019064034 A1 | 4/2019 |

*Primary Examiner* — Jonathan M Dager
(74) *Attorney, Agent, or Firm* — Taft, Stettinius & Hollister LLP (57) ABSTRACT

A system, method, and apparatus includes management of engine off coasting during operation of a vehicle. The engine speed is increased and/or fueling of the engine is re-initiated before the engine and driveline are finally engaged when the engine off coasting mode of operation is terminated.

12 Claims, 11 Drawing Sheets

(56) References Cited

U.S. PATENT DOCUMENTS

| | | | |
|---|---|---|---|
| 10,583,836 B2 | 3/2020 | Takada et al. | |
| 10,589,731 B2 | 3/2020 | Iwamoto et al. | |
| 11,662,724 B2* | 5/2023 | Endo | B60W 50/06 701/23 |
| 11,959,430 B2* | 4/2024 | Fukuda | F02D 41/065 |
| 2004/0058779 A1* | 3/2004 | Ayabe | B60W 10/06 477/121 |
| 2011/0053735 A1* | 3/2011 | Lewis | F02D 41/126 477/99 |
| 2011/0054765 A1* | 3/2011 | Lewis | F02N 5/04 701/112 |
| 2011/0130938 A1* | 6/2011 | Seok | B60W 30/146 477/173 |
| 2011/0136620 A1* | 6/2011 | Gibson | B60W 10/06 477/64 |
| 2011/0320109 A1* | 12/2011 | Polimeno | B60L 50/16 701/113 |
| 2012/0135840 A1* | 5/2012 | Tatewaki | B60W 10/115 477/115 |
| 2012/0172175 A1* | 7/2012 | Nedorezov | B60W 10/026 477/169 |
| 2012/0238405 A1* | 9/2012 | Gibson | F02N 11/0814 477/84 |
| 2014/0045650 A1* | 2/2014 | Nedorezov | B60W 10/06 477/52 |
| 2014/0057754 A1* | 2/2014 | Gibson | B60W 10/06 477/54 |
| 2015/0259008 A1* | 9/2015 | Seguchi | B60W 30/18072 701/41 |
| 2016/0009292 A1* | 1/2016 | Yokokawa | B60W 10/02 701/53 |
| 2018/0257654 A1* | 9/2018 | Tashiro | B60W 10/06 |
| 2019/0100204 A1* | 4/2019 | Plianos | B60W 30/18127 |
| 2019/0184961 A1* | 6/2019 | Gierling | B60W 10/06 |

* cited by examiner

SYSTEMS AND METHODS FOR
RE-STARTING ENGINE DURING COASTING
EVENT

CROSS-REFERENCE TO RELATED
APPLICATION

The present application claims the benefit of the filing date of U.S. Provisional Application Ser. No. 63/242,747 filed on Sep. 10, 2021, which is incorporated herein by reference.

BACKGROUND

The present application relates generally to management of re-starting an internal combustion engine, and more particularly to re-starting an internal combustion engine during a vehicle coasting event in which the engine is shut off.

Improved fuel economy for vehicles can be obtained by allowing the vehicle to coast during certain operating and drive cycle conditions. However, these benefits are not heretofore realized with all vehicles, such as those which maintain engine fueling so the engine idles during the coasting event. Therefore, there remains a significant need for the apparatuses, methods and systems disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

There is disclosed herein examples of systems, methods, and apparatuses for re-starting an internal combustion during an engine-off coasting event when coasting termination conditions are determined. Re-starting the engine can include increasing the speed of the engine to a desired speed for final re-engagement of the driveline by closing a clutch and/or re-initiating fueling to the engine before the driveline is finally re-engaged. The rate, sequence, and/or timing of closing the clutch and re-initiating the fueling to increase the engine speed can be selected to reduce the clutch energy for re-starting the engine, reducing clutch wear and improving clutch life. In an embodiment, an engine re-start mode is selected from a plurality of engine re-start modes in response to one or more operating parameters, such as a predicted vehicle speed.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF ILLUSTRATIVE
EMBODIMENTS

Figure 1:
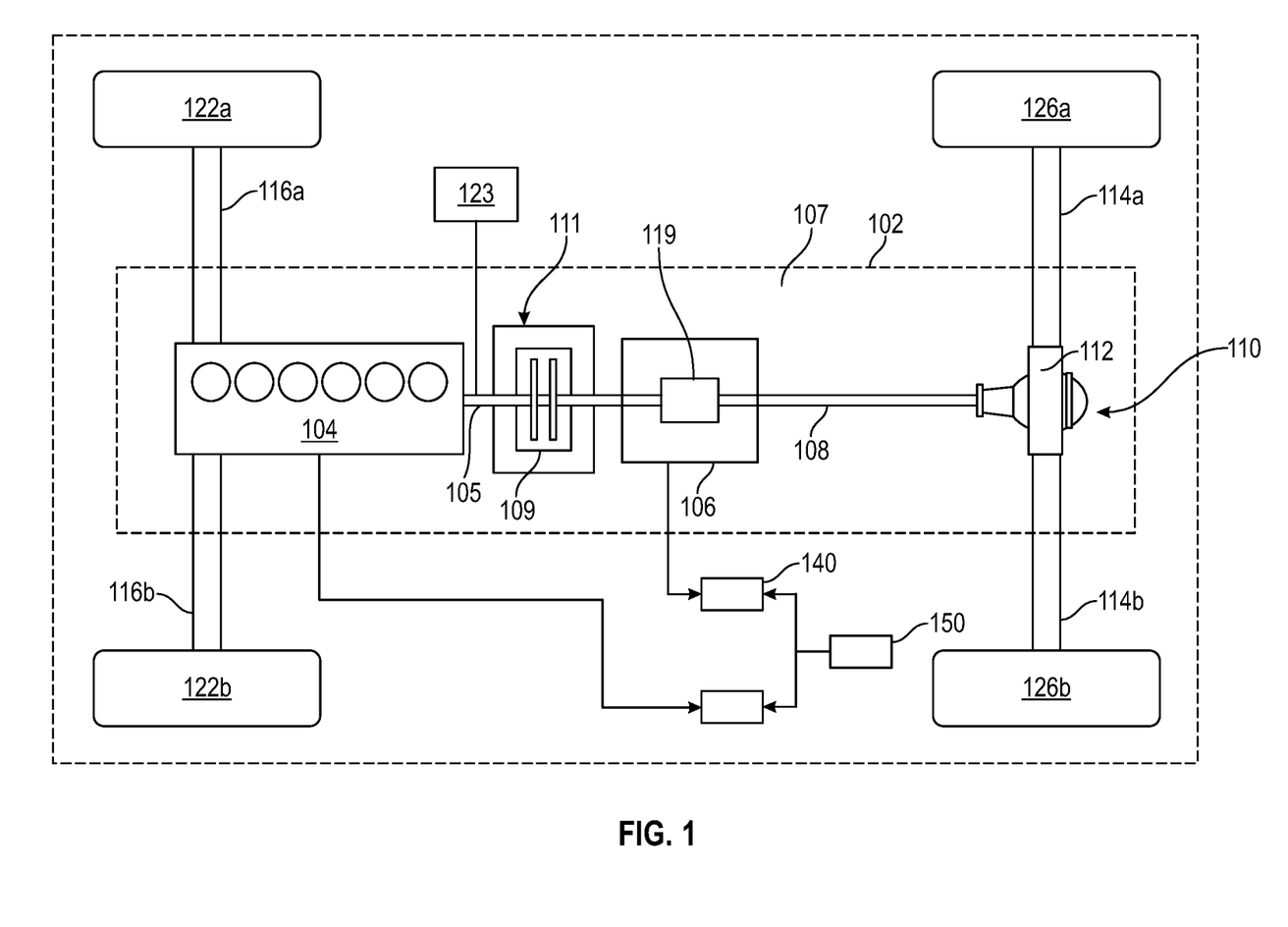
FIG. 1 is a schematic illustration of a vehicle with a controllable transmission for engine off coasting management of the vehicle.

With reference to FIG. 1, there is illustrated a schematic view of an exemplary vehicle 100 including a powertrain 102 incorporated within vehicle 100. In the illustrated embodiment, the powertrain 102 includes an engine 104, such as an internal combustion engine, structured to generate power for the vehicle 100. The powertrain 102 further includes a transmission 106 connected to the engine 104 for adapting the output torque of the engine 104 and transmitting the output torque to a driveline 107 including drive shaft 108. In certain embodiments, the transmission 106 is an automated manual transmission that may be disengageably connected to an engine crankshaft 105 via a clutch 109. Transmission 106 may alternatively or additionally include an actuator 119 that actuates transmission 106 to achieve a neutral gear position to disconnect engine 104 from driveline 107. Vehicle 100 may also include a starter 123 which can be used to rotate engine 104 from a stalled or zero speed condition to achieve a cranking speed for starting of engine 104.

In the rear wheel drive configuration illustrated for vehicle 100, the driveline 107 of powertrain 102 includes a final drive 110 having a rear differential 112 connecting the drive shaft 108 to rear axles 114a, 114b. It is contemplated that the components of powertrain 102 may be positioned in different locations throughout the vehicle 100. In one non-limiting example of a vehicle 100 having a front wheel drive configuration, transmission 106 may be a trans axle and final drive 110 may reside at the front of the vehicle 100, connecting front axles 116a and 116b to the engine 104 via the transaxle. It is also contemplated that in some embodiments the vehicle 100 is in an all-wheel drive configuration.

In the illustrated embodiment, vehicle 100 includes two front wheels 122a, 122b mounted to front axles 116a, 116b, respectively. Vehicle system 100 further includes two rear wheels 126a, 126b mounted to rear axles 114a, 114b, respectively. It is contemplated that vehicle 100 may have more or fewer wheels than illustrated in FIG. 1. Vehicle 100 may also include various components not shown, such a fuel system including a fuel tank, a front differential, a braking system, a suspension, an engine intake system and an exhaust system, which may include an exhaust aftertreatment system, to name a few examples.

Vehicle 100 includes an electronic or engine control unit (ECU) 130, sometimes referred to as an electronic or engine control module (ECM), or the like, which is directed to regulating and controlling the operation of engine 104. A transmission control unit (TCU) 140 is illustrated in vehicle 100, which is directed to the regulation and control of transmission 106 operation. ECU 130 and TCU 140 are each in electrical communication with a plurality of vehicle sensors (not shown) in vehicle 100 for receiving and transmitting conditions of vehicle 100, such as temperature and pressure conditions, for example. In certain embodiments, the ECU 130 and the TCU 140 may be combined into a single control module, commonly referred to as a powertrain control module (PCM) or powertrain control unit (PCU), or the like. It is contemplated that ECU 130 and/or TCU 140 may be integrated within the engine 104 or transmission 106, respectively. Other various electronic control units for vehicle subsystems are typically present in vehicle system 100, such as a braking system electronic control unit and a cruise control electronic control unit, for example, but such other various electronic control units are not show in vehicle 100 to preserve clarity.

Vehicle system 100 further includes a coasting management (CM) controller 150, which may be directed to the control of the operations described herein and/or directed toward an intermediary control for the regulation and control of the powertrain 102 in vehicle system 100. In the illustrated embodiment, CM controller 150 is in electrical communication with each of the ECU 130 and TCU 140. In certain embodiments, at least a portion of the CM controller 150 may be integrated within, or be, the ECU 130 and/or TCU 140. CM controller 150 may further be in electrical communication with one or more of the plurality of vehicle sensors in vehicle 100 for receiving and transmitting conditions of vehicle 100, such as temperature and pressure conditions, route conditions, terrain conditions, speed conditions, and weather conditions, for example. It is contemplated that at least a portion of the conditions and/or measured inputs used for interpreting signals by the CM controller 150 may be received from ECU 130 and/or TCU 140, in addition to or alternatively to the plurality of vehicle sensors. Furthermore, the CM controller 150 may include a processor, and may also be referred to as a control unit.

The CM controller 150 includes stored data values, constants, and functions, as well as operating instructions stored on, for example, a computer readable medium. Any of the operations of exemplary procedures described herein may be performed at least partially by the CM controller 150. In certain embodiments, the ECU 130, TCU 140, and/or CM controller 150 includes one or more control units disclosed herein with one or more modules structured to functionally execute the operations of the control unit. The description herein including modules emphasizes the structural independence of the aspects of the ECU 130, TCU 140, and/or CM controller 150, and illustrates one grouping of operations and responsibilities of the ECU 130, TCU 140, and/or CM controller 150. Other groupings that execute similar overall operations are understood within the scope of the present application. Modules may be implemented in hardware and/or instructions on computer readable medium, and modules may be distributed across various hardware or computer readable medium components. More specific descriptions of certain embodiments of control operations are included below. Operations illustrated are understood to be exemplary only, and operations may be combined or divided, and added or removed, as well as re-ordered in whole or part, unless stated explicitly to the contrary herein.

Certain operations described herein include operations to interpret or determine one or more parameters. Interpreting or determining, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a runtime parameter by any means known in the art, and/or by receiving a value by which the interpreted or determined parameter can be calculated, and/or by referencing a default value that is interpreted or determined to be the parameter value.

In certain embodiments, the ECU 130, TCU 140, and/or CM controller 150 receives operating inputs, such as a fuel amount input, a weather conditions input, and a route conditions input from one or more sensors and/or one or more external devices for detecting route conditions. The CM controller 150 may also receive engine conditions input from the ECU 130 and transmission conditions input from the TCU 140. Engine conditions may include a brake actuation parameter, a throttle position parameter, a torque request parameter, an ambient air pressure, an ambient air temperature, an engine temperature, an engine torque, an engine speed, an engine speed rate of change, an engine degrade state, and a brake position, for example. Transmission conditions may include a transmission gear ratio, a current transmission gear, a final drive ratio, a clutch actuator position, and a neutral gear state, for example.

In operation, CM controller 150 controls vehicle operations that provide both anticipated and currently desired vehicle 100 operation behavior to optimize fuel economy in response to the operating inputs, the engine conditions input, the transmission conditions input, engine fueling parameters, and/or engine braking/friction parameters. CM controller 150 is operable to assume active control of the vehicle 100, regulating a vehicle speed, the engine torque curve, and/or other powertrain 102 operating conditions to ensure optimal vehicle 100 operation, or passive control which allows the operator to take recommended actions. In the present application, CM controller 150 is configured to interpret operating inputs, engine conditions, and transmission conditions to determine if a coasting opportunity is available, and to automatically (without operator input) disconnect the engine 104 from the driveline 107 to enable coasting of vehicle 100 to obtain, for example, fuel economy benefits. Further fuel economy benefits can be provided by shutting off engine 104 during coasting by cutting off fuel so that the engine 104 does not idle during coasting operations.

In response to CM controller 150 interpreting or receiving an input that a coasting opportunity is available for vehicle 100 and desired, CM controller 150 outputs, in a first embodiment, a transmission gear command to TCU 140 or, in a second embodiment, a clutch actuator command to TCU 140. The transmission gear command and clutch actuator command each disengage engine 104 from driveline 107 in response to coasting opportunity to provide coasting operation of vehicle 100. In addition, the CM controller 150 can shut off engine 104 during the coasting operation by cutting off fuel to engine 104 during the coasting operation.

In one embodiment, transmission gear command controls an actuator 119 (shown in FIG. 1 as located within the contours of the automated manual transmission 106, but it will be appreciated that the actuator 119 can be located elsewhere) that actuates transmission 106 to achieve a neutral gear position to disconnect engine 104 from driveline 107. In another embodiment, clutch actuator command actuates a clutch actuator 111 associated with clutch 109 to disengage clutch 109 and disconnect engine 104 from driveline 107. The transmission gear command or clutch actuator command can be activated by CM controller 150 during cruise control operation of vehicle 100, or anytime CM controller 150 is active for controlling operations of vehicle 100 in response to certain conditions. The coasting mode of operating can be overridden by operator input, such as when the operator increases the throttle position, pushes a brake pedal, or moves a gear level, to re-engage engine 104 to driveline 107 and terminate coasting operation of vehicle 100.

Although as discussed above the CM controller 150 can be structured to output a command to disengage the engine 104 from the driveline 107 and cut off fueling to engine 104 in response to an engine off coasting opportunity, the CM controller 150 can also be structured to monitor performance of the vehicle 100 and re-start engine 104 and re-engage the engine 104 to the driveline 107 when conditions warrant. For example, such engine 104 re-start and engine 104 re-engagement to the driveline 107 can occur when vehicle speed and/or predicted speed needs to be controlled by operating engine 104, such as to prevent the speed from dropping below a minimum threshold, to control vehicle speed in response to an object or vehicle in front of the coasting vehicle, or other event in which engine off coasting is to be terminated. The conditions dictating an engine re-start can be monitored by the CM controller 150 or other suitable module or control unit during the engine off coasting event.

FIGS. 2A-2D depict embodiments of coasting control schemes using both engine off coasting and idle coasting. In both idle coasting and engine off coasting the engine 104 is disengaged from the driveline 107 such as by holding the clutch 109 open or neutralizing the transmission 106 in response to the control logic in CM controller 150 concluding coasting conditions are met. Idle coasting maintains fueling of the engine so the engine maintains idle speed. Engine off coasting differs from idle coasting in that fueling to the engine is cut off or terminated during the coasting event, allowing the engine to naturally decelerate until stalling. Engine off coasting can reduce the total fuel used over the mission as compared to idle coasting. In addition, engine drag is reduced and vehicle momentum is increased as compared to idle coasting operation, allowing a delay in fueling resumption. Engine off coasting can also be employed as extension of idle coasting in certain embodiments when conditions indicated it is favorable to shut off the engine rather than maintaining an idling engine.

Figure 2A:
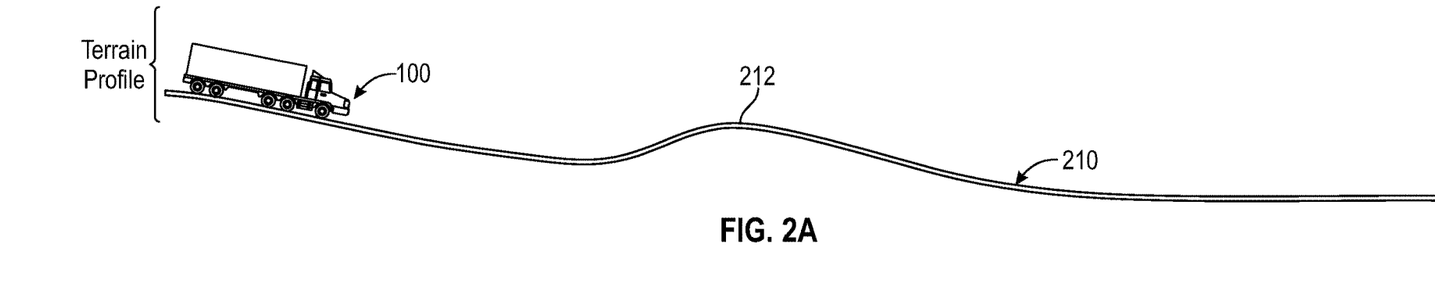
FIG. 2A is a schematic of a vehicle on a grade profile including downhill and uphill segments.
Figure 2B:
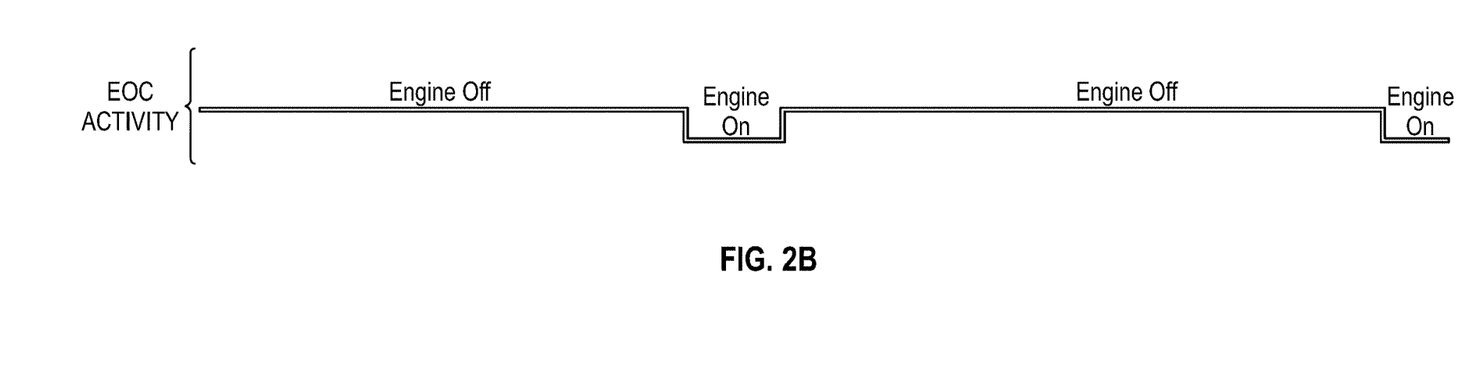
FIG. 2B is a depiction of whether an engine is on or off along the grade profile of FIG. 2A.
Figure 2C:
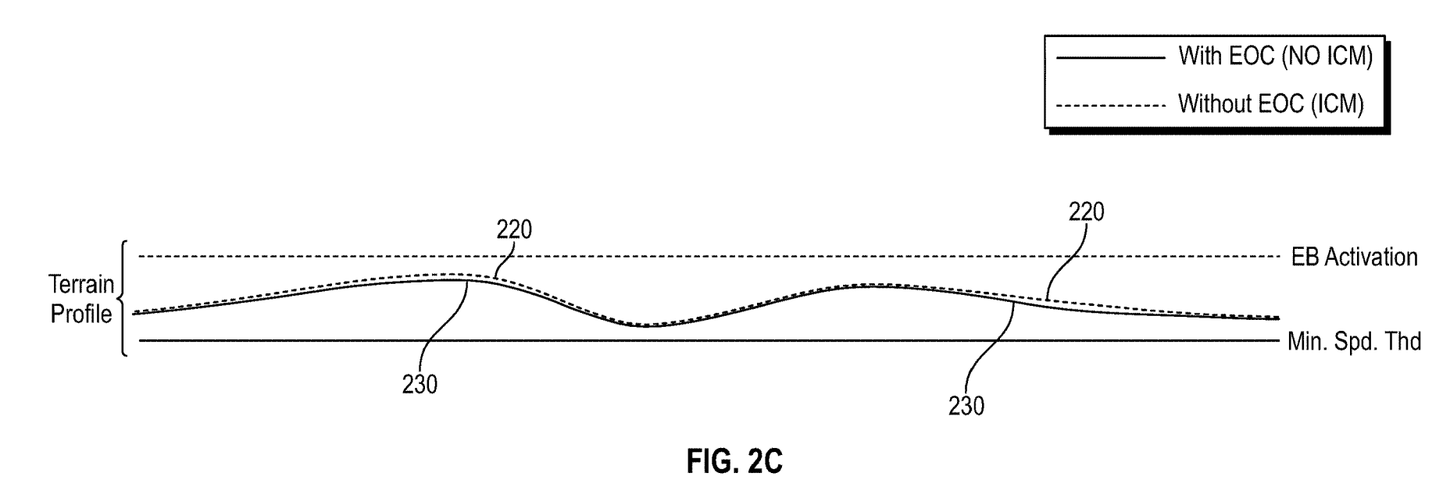
FIG. 2C depicts a speed of the vehicle along the grade profile of FIG. 2A.
Figure 2D:
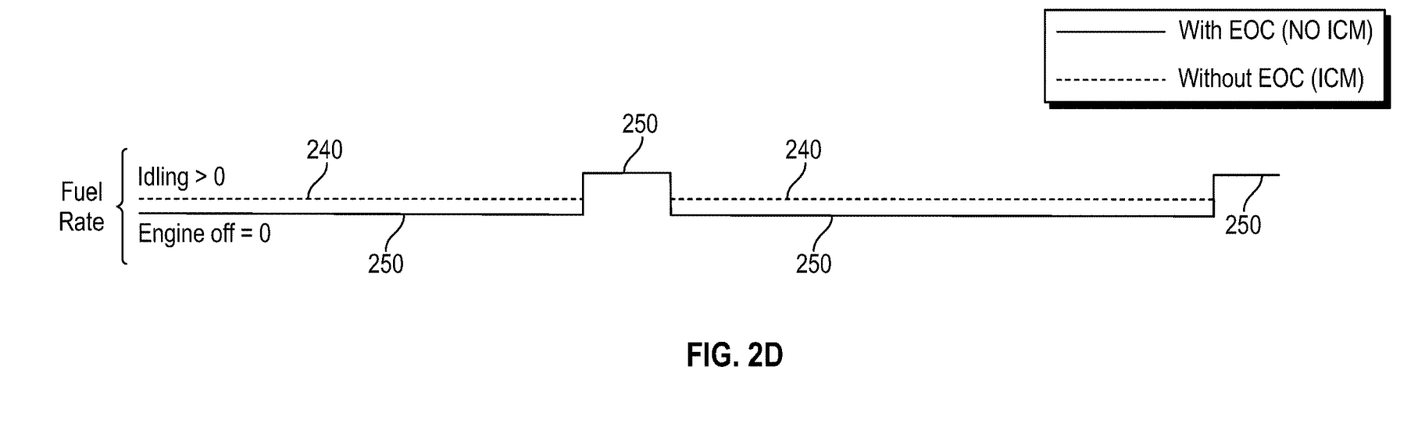
FIG. 2D depicts a fuel rate to the engine along the grade profile of FIG. 2A.

Shown in FIG. 2A is a schematic of vehicle 100 on a route segment 210 with an overall downhill grade having an intermediate uphill segment 212. FIGS. 2B-2D depict various control schemes including an engine on/off status in FIG. 2B, the vehicle speed in FIG. 2C, and the fueling activity in FIG. 2D. Any of the control activities for traversing the route segment can be implemented in the CM controller 150 or other controller/control modules discussed herein.

FIG. 2B depicts the engine status along the route segment 210. The engine off coasting mode of operation is active along the initial downhill part of the route segment. The engine off coasting mode is temporarily deactivated to traverse the intermediate uphill segment 212 by re-starting engine 104, and then the engine off coasting mode of operation is re-activated and the engine is shut off by cutting fuel to engine 104 after reaching the subsequent downhill segment. At the end of the last downhill segment, the engine off coasting mode of operation is terminated and the engine is turned on by re-starting the engine 104.

The engine off coasting mode of operation will be understood as a condition in which the engine 104 is disengaged from driveline 107 in response to a coasting opportunity, where "Engine Off" in FIG. 2B represents cutting of fuel to the engine 104 so the engine 104 stalls. "Engine On" in FIG. 2B represents re-engagement of the engine 107 to the driveline 107 and resumption of fueling to engine 104 so the engine 104 propels the vehicle. However, embodiments in which the coasting mode of operation with the engine off is maintained even during the intermediate uphill segment are also contemplated when predicted vehicle speed along the intermediate uphill segment is maintained above minimum threshold even while engine off coasting is active.

FIG. 2C depicts the speed profiles of the vehicle in which an idle coasting speed is shown in line 220, and engine off coasting speed is shown in line 230. A lower, minimum speed threshold is shown that can be used to determine when to terminate the coasting mode of operation based on the various inputs to CM controller 150 and/or a predicted vehicle speed along the route segment 210, and an upper speed threshold (EB activation) is shown in which engine braking can be activated to maintain the vehicle speed below the upper speed threshold. FIG. 2D depicts fuel flow rate within engine 104. A baseline fueling amount is shown in line 240 during idle coasting that is maintained during idle coasting operations. In contrast, fueling to engine 104 is shown in line 250 with zero fueling during engine off coasting operation. Fueling is re-initiated while the engine off coasting mode is exited during the intermediate uphill segment 212. The engine off coasting can be resumed on the downhill segment following the intermediate uphill segment 212.

When the engine off coasting is terminated, it is necessary to re-start the engine 104 to resume nominal operations for vehicle 100. FIGS. 3A-6E show various embodiments of engine re-start strategies that can be employed by CM controller 150 and/or in any of the other control units/control modules discussed herein in response to termination of engine off coasting and resumption of nominal engine operations to propel the vehicle 100. In an embodiment, CM controller 150 is configured to select one of the re-start modes discussed herein in response to one or more operating condition inputs, such as a predicted vehicle speed at re-start of the engine 104 for one or more upcoming route segments. In an embodiment, the engine re-start modes are ranked in a hierarchy of preference depending on the route conditions and/or operating conditions of the vehicle 100. If a preferred or higher ranked re-start mode is not available, then the next ranked re-start mode can be selected.

Figure 3A:
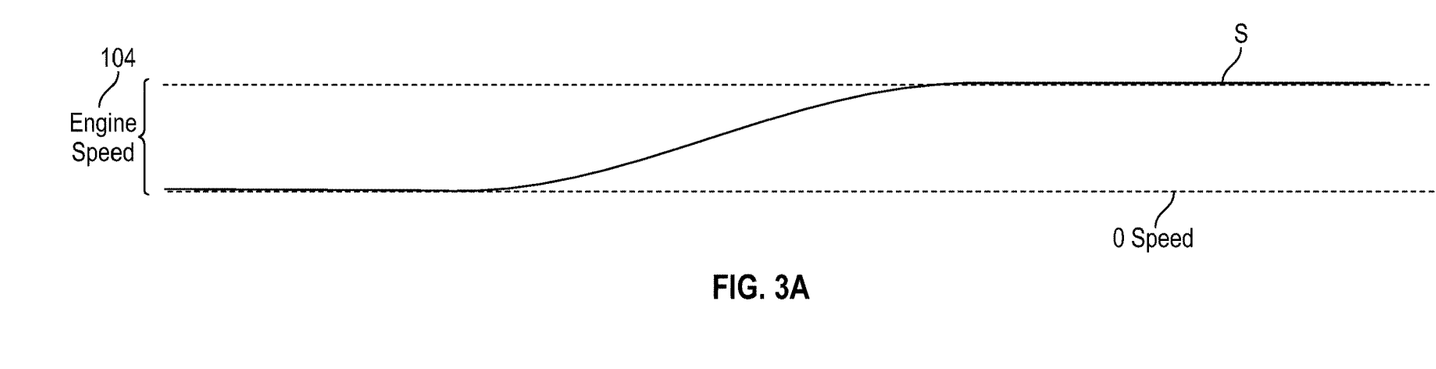
FIGS. 3A-3E illustrate profiles for the engine speed, clutch position, fueling activity, starter activity, and driveline activity for a first re-start mode for the engine.
Figure 3B:
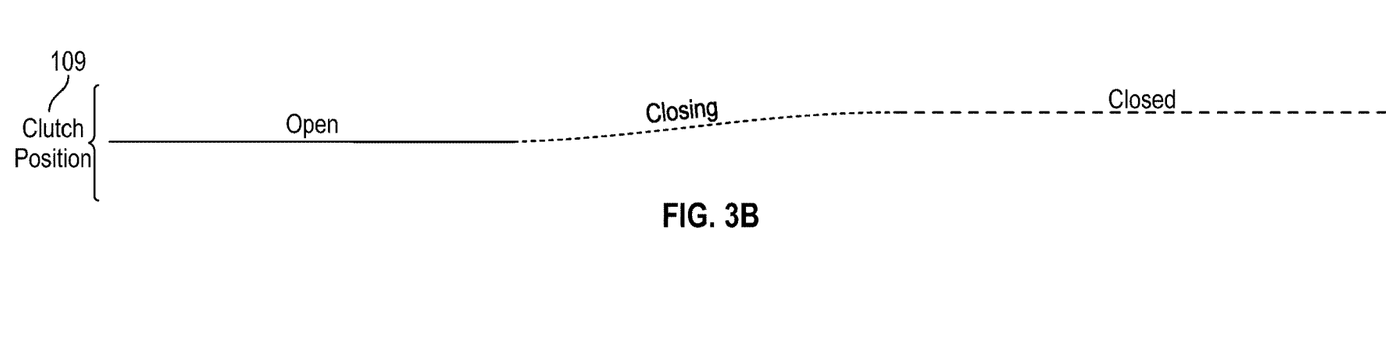

FIGS. 3A-3E depict a first re-start mode for engine 104 in which the transmission 106 is solely responsible for bringing engine 104 back to a desired operating speed for final re-engagement to the driveline 107, such as by engagement of clutch 109 and/or actuator 119. FIG. 3A includes an engine speed profile, and FIG. 3B shows a profile for clutch position relative to engine speed over time. Closing of the clutch 109 is controlled to ramp up the engine speed to a desired operating speed S for final engagement of the engine to the driveline 107 in a synced condition. The closing rate of clutch 109 is controlled so that the engine speed gradually increases from a stalled condition to the desired operating speed S, when the clutch 109 is completely closed to finally engage engine 104 with driveline 107 in a synced condition.

Figure 3C:
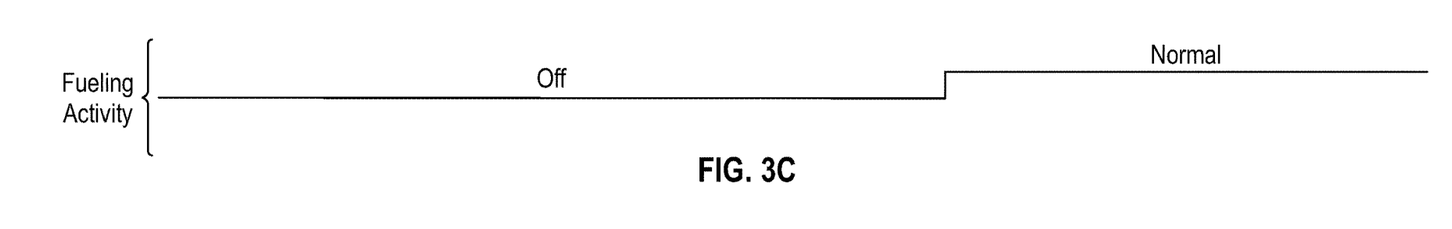
Figure 3D:
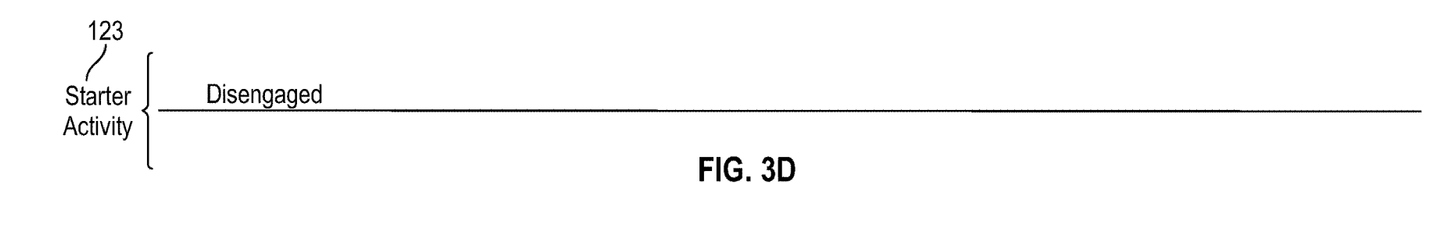
Figure 3E:
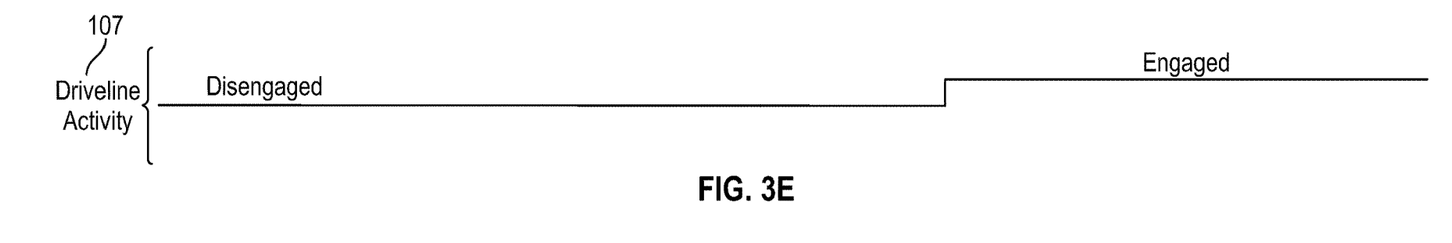

As shown in FIG. 3C, normal or nominal fueling of engine 104 is resumed when the clutch 109 is completely closed, at which time the driveline 107 is completely engaged to engine 104 as shown in FIG. 3E. As shown in FIG. 3D, the starter 123 is not used to re-start the engine 104 in this embodiment. The first re-start mode can be selected when the fastest mode for re-starting the engine is desired. However, the first re-start mode may be ranked lower in the hierarchy of re-start modes disclosed herein in order to minimize wear of clutch 109.

Figure 4A:
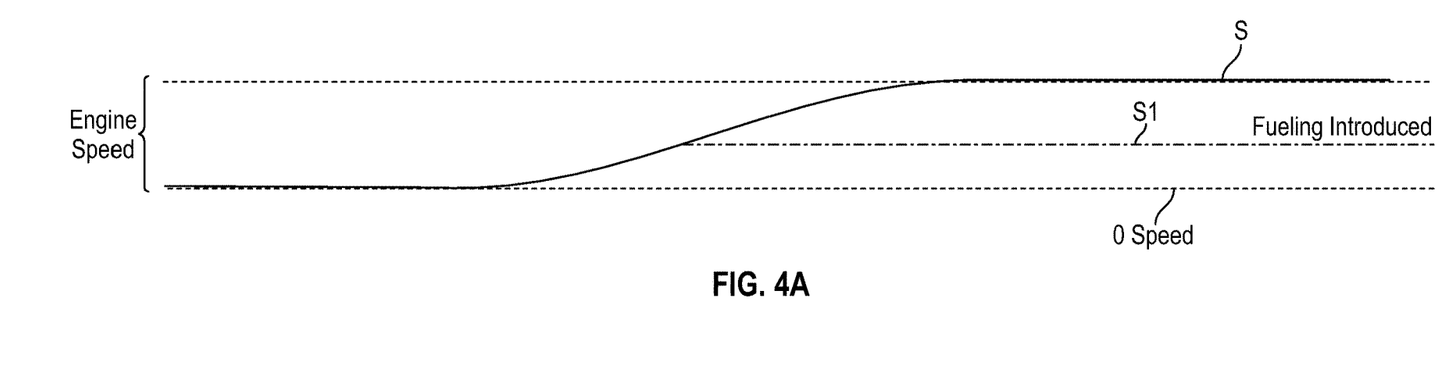
FIGS. 4A-4E illustrate profiles for the engine speed, clutch position, fueling activity, starter activity, and driveline activity for a second re-start mode for the engine.
Figure 4B:
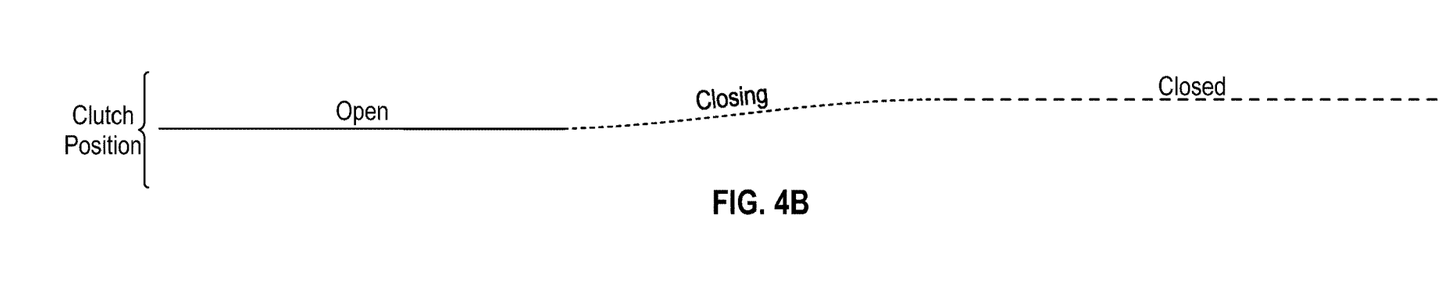
Figure 4C:
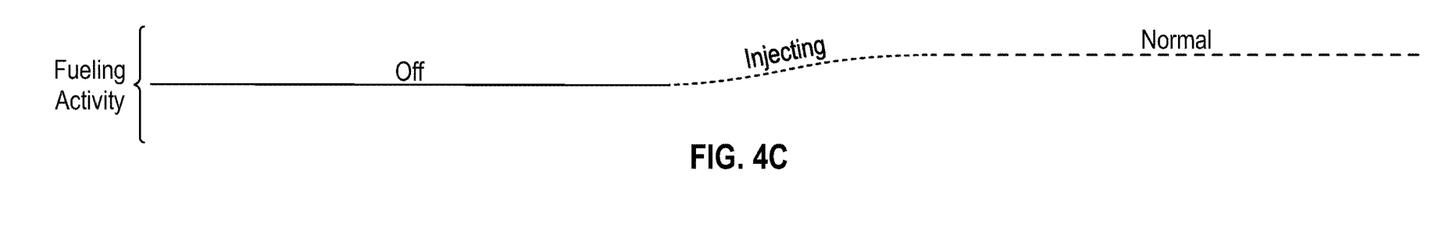

FIGS. 4A-4E depict a second re-start mode for engine 104 in which clutch 109 and fueling to engine 104 are both employed to bring engine 104 back to a desired operating speed for final re-engagement to the driveline 107. FIG. 4A includes an engine speed profile, and FIG. 4B shows a profile for clutch position relative to engine speed over time. Closing of the clutch 109 is controlled at a rate that ramps up the engine speed from a stalled condition to a first speed threshold S1 at which fueling of engine 104 re-initiated for starting the engine 104 as shown in FIG. 4C. Closing of clutch 109 and fueling of engine 104 continues simultaneously until the engine 104 reaches the desired operating speed S, when the clutch 109 is completely closed to complete the engagement with the speed of the engine 104 synced to the speed of the driveline 107.

Figure 4D:
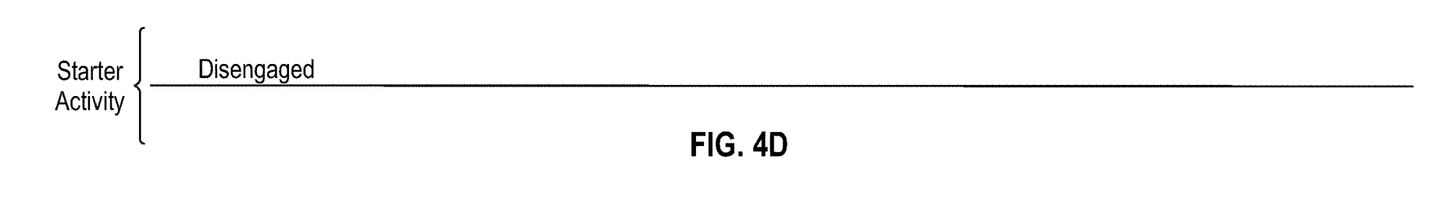
Figure 4E:
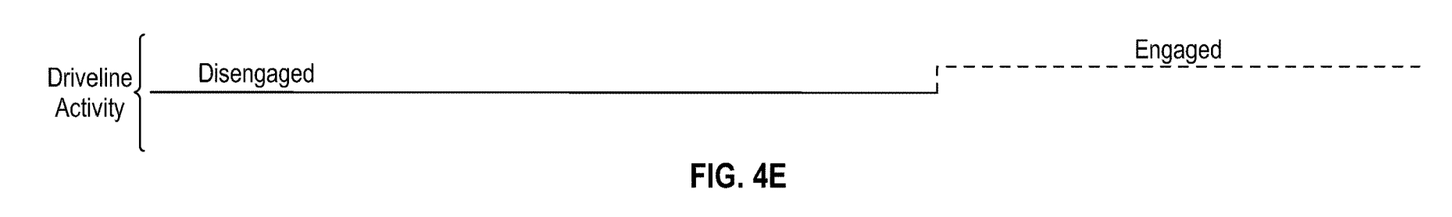

As shown in FIG. 4C, normal or nominal fueling of engine 104 is resumed when the clutch 109 is completely closed, at which time the driveline is engaged as shown in FIG. 4E. As shown in FIG. 4D, the starter 123 is not used to re-start the engine in this embodiment. The second re-start mode reduces clutch wear as compared to the first re-start mode discussed above with respect to FIGS. 3A-3E, but does involve repeatable fuel delivery and response to bring the engine 104 up to speed S for re-engagement.

Figure 5A:
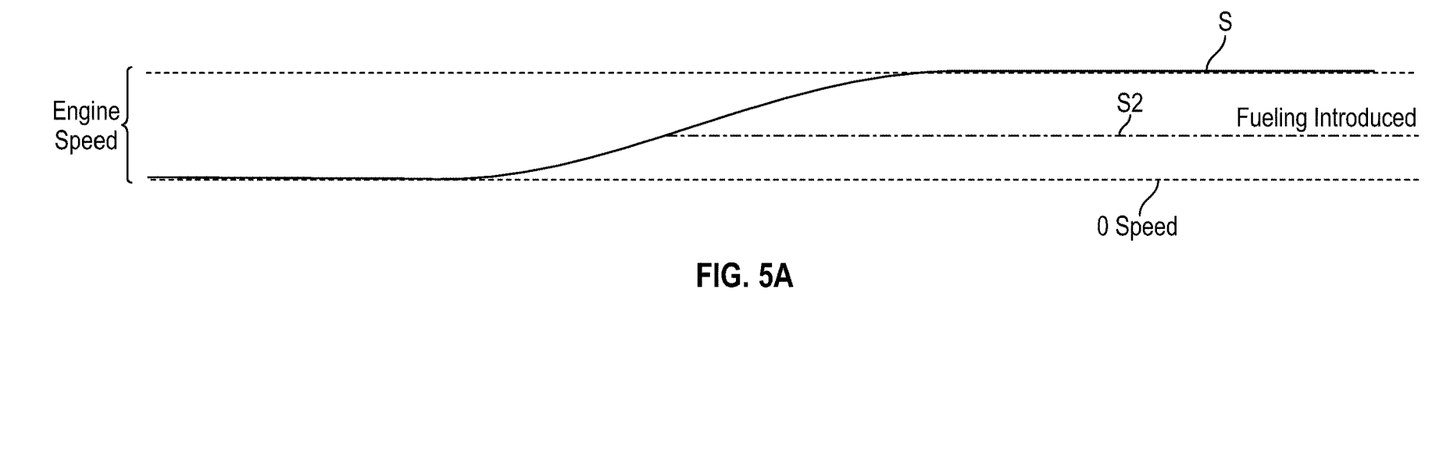
FIGS. 5A-5E illustrate profiles for the engine speed, clutch position, fueling activity, starter activity, and driveline activity for a third re-start mode for the engine.
Figure 5B:
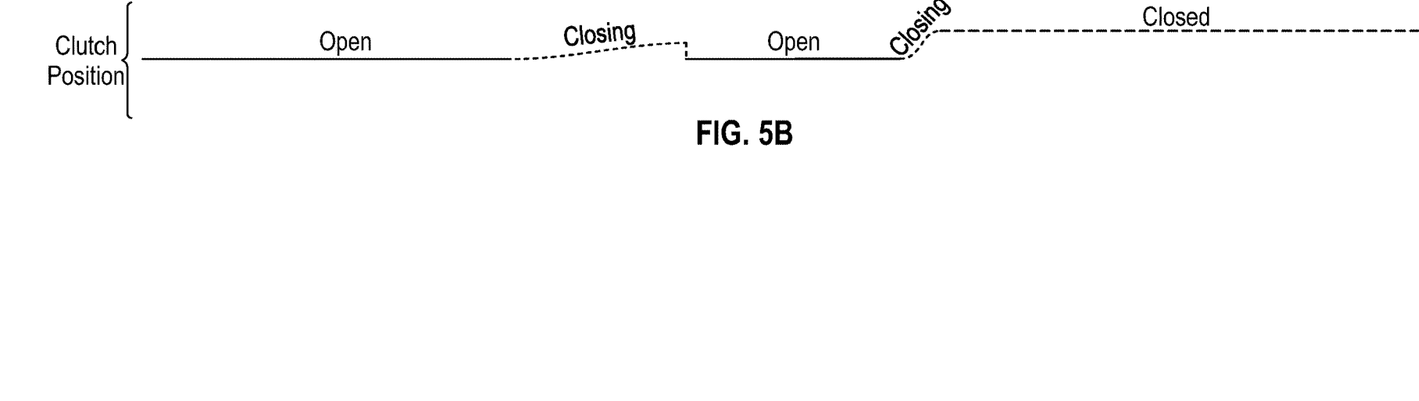
Figure 5C:
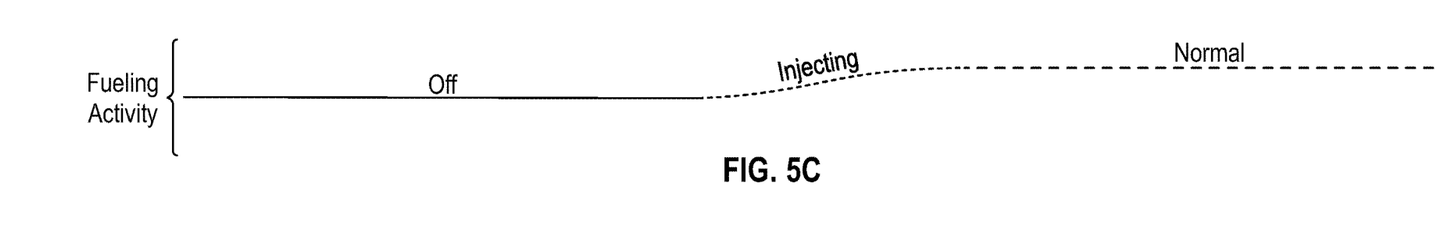

FIGS. 5A-5E depict a third re-start mode for engine 104 in which clutch 109 and fueling to engine 104 are both employed in a manner that differs from FIGS. 4A-4E to bring engine 104 back to a desired operating speed for final re-engagement to the driveline 107. FIG. 5A includes an engine speed profile, and FIG. 5B shows a profile for clutch position relative to engine speed over time. Closing of the clutch 109 is controlled at a rate that ramps up the engine speed from a stalled condition to a second speed threshold S2, at which time the clutch 109 is opened again and fueling of engine 104 re-initiated for starting the engine 104 as shown in FIG. 5C. Speed threshold S2 can be, for example, a cranking or idle speed of engine 104. Fueling of engine 104 continues to increase until engine 104 approaches or reaches the desired operating speed S. Clutch 109 is then completely closed from its open condition to complete the engagement of engine 104 with driveline 107 with the speed of the engine 104 synced to the speed of the driveline 107.

Figure 5D:
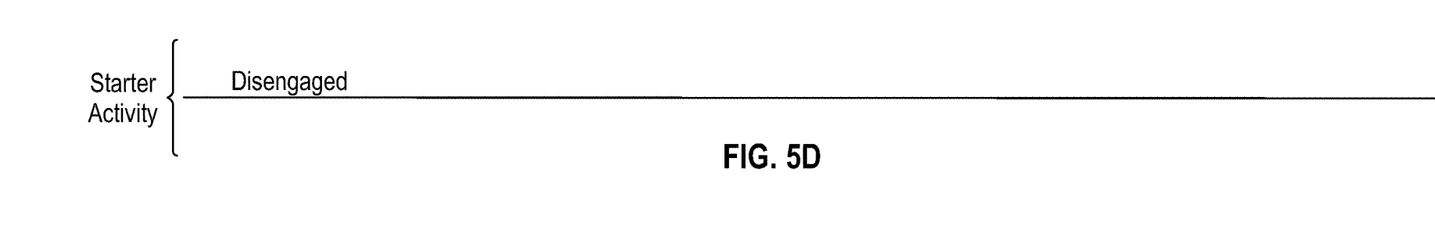
Figure 5E:
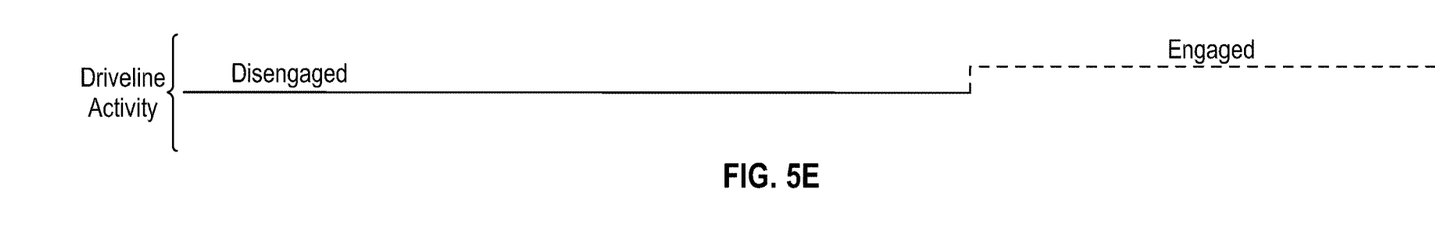

As shown in FIG. 5C, normal or nominal fueling of engine 104 is resumed when the clutch 109 is completely closed, at which time the driveline 107 is engaged as shown in FIG. 5E. As shown in FIG. 5D, the starter 123 is not used to re-start the engine 104 in this embodiment. The third re-start mode reduces clutch wear as compared to the first re-start mode discussed above with respect to FIGS. 3A-3E, but does involve repeatable fuel delivery response like the re-start mode of FIGS. 4A-4E, and also repeatable clutch positioning accuracy in contrast to the second re-start mode discussed above with respect to FIGS. 4A-4E.

Figure 6A:
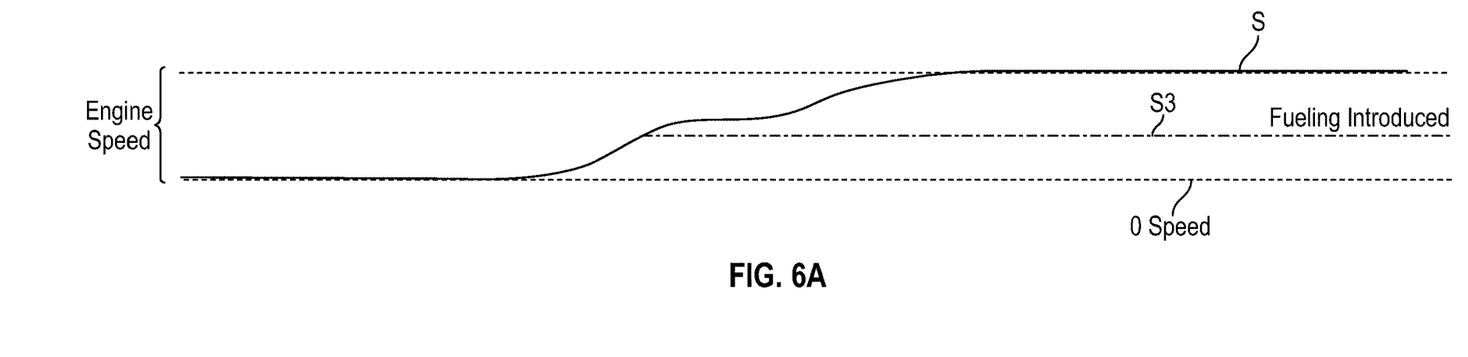
FIGS. 6A-6E illustrate profiles for the engine speed, clutch position, fueling activity, starter activity, and driveline activity for a fourth re-start mode for the engine.
Figure 6B:
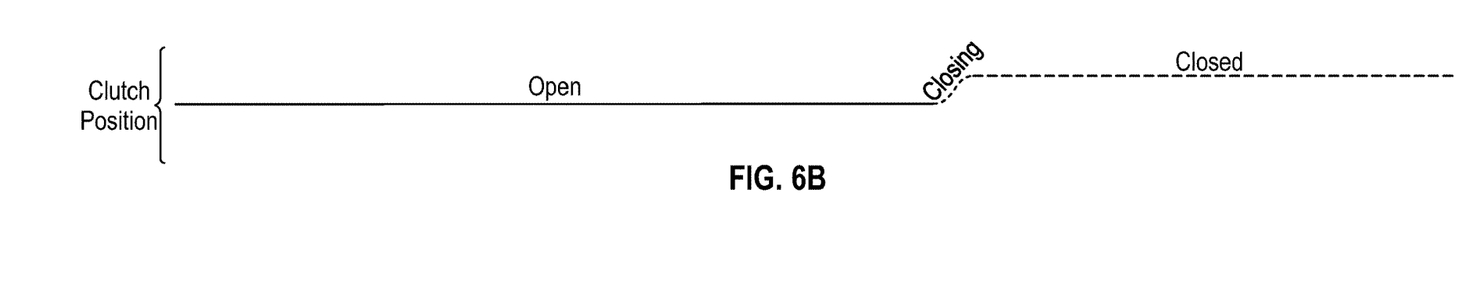
Figure 6C:
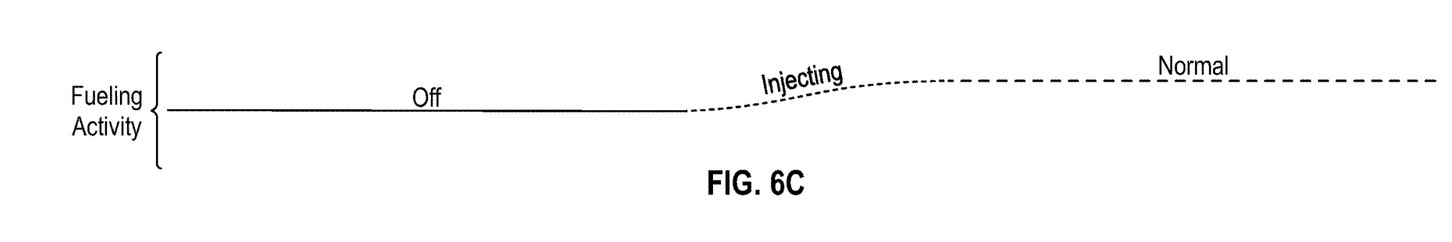
Figure 6D:
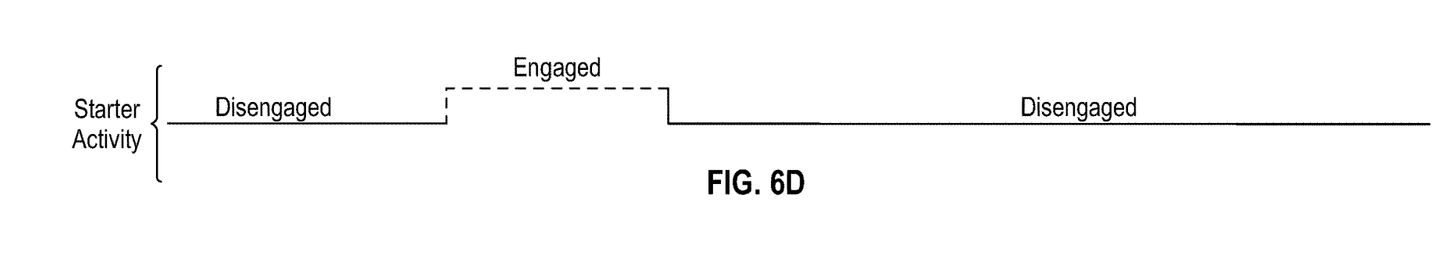

FIGS. 6A-6E depict a fourth re-start mode for engine 104 in which starter 123 and fueling to engine 104 are both employed to bring engine 104 back to a desired operating speed from an engine off coasting mode of operation. This fourth re-start mode can be used, for example, as a backup mode when the clutch 109 is unresponsive or the other restart modes discussed above don't work as intended. FIG. 6A includes an engine speed profile, and FIG. 6B shows a profile for clutch position relative to engine speed over time. Closing of the clutch 109, if possible, is delayed until engine 104 reaches desired operating speed threshold S. In order to initiate re-starting of engine 104, starter is engaged as shown in FIG. 6D to increase the speed of engine 104 to a third speed threshold S3. At third speed threshold S3 fueling of engine 104 is re-initiated as shown in FIG. 6C for starting the engine 104. Fueling of engine 104 continues to increase until the engine 104 reaches the desired operating speed S, and then the clutch 109 is completely closed, if possible or if not already closed, to complete the engagement with the speed of the engine 104 synced to the speed of the driveline 107.

Figure 6E:
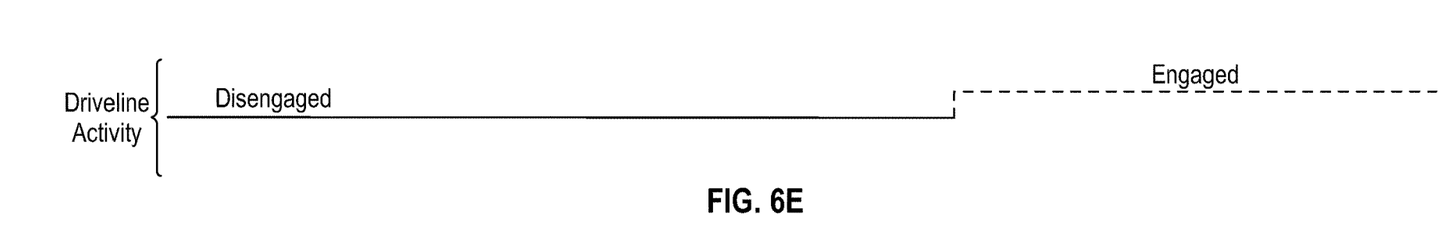

As shown in FIG. 6C, normal or nominal fueling of engine 104 is resumed when the clutch 109 is completely closed, at which time the driveline 107 is engaged as shown in FIG. 6E. The fourth re-start mode can be, for example, an emergency mode that allows vehicle 100 to retain full braking, steering, charging, and driver comfort capabilities in order to get the vehicle 100 stopped or out of the immediate path of travel. Since wear and tear on starter 123 is increased, this fourth starting mode can also, for example, be used as a backup mode in the event other starting modes experience problems preventing completion, and/or ranked last in the hierarchy of starting mode selection.

According to one aspect of the present disclosure, a method includes operating a vehicle in a coasting mode during which fuel to an engine of the vehicle is cut-off and a driveline of the vehicle is disengaged from the engine while the vehicle coasts; determining the coasting mode of operation of the vehicle is to be terminated; in response to the determining, selecting an engine re-start mode that increases a speed of the engine by coupling the engine to the driveline and re-initiating fueling to the engine; and re-engaging the driveline to the engine in response to the speed of the engine being increased to a desired operating speed.

In an embodiment of the method, coupling the engine to the driveline includes initiating closing a clutch between the driveline and the engine. In a refinement of this embodiment, closing the clutch is initiated before re-initiating fueling to the engine.

In a further refinement of this embodiment, fueling to the engine is re-initiated during closing the clutch. In yet a further refinement, fueling to the engine is re-initiated in response to the speed of the engine increasing to a speed threshold less than the desired operating speed.

In a further refinement of this embodiment, the method includes re-opening the clutch before re-initiating fueling to the engine, and then re-initiating fueling to the engine while the clutch is re-opened. In yet a further refinement, the clutch is re-opened in response to the speed of the engine increasing to a first threshold less than the desired operating speed. In yet a further refinement, the method includes re-closing the clutch in response to the speed of the engine achieving a second threshold greater than the first threshold via fueling to the engine. In yet a further refinement, the second threshold approximates the desired operating speed.

In an embodiment of the method, the speed of the engine is increased by engaging a starter to increase the speed of the engine to a first threshold before re-initiating fueling the engine, and then disengaging the starter in response to the speed of the engine reaching the first threshold. In a refinement of this embodiment, the method includes closing a clutch after increasing the speed of the engine to a second threshold greater than the first threshold via re-initiating fueling to the engine.

In another aspect of the present disclosure, there is disclosed an apparatus that includes a coasting controller for a vehicle having an engine structured to provide motive power to the vehicle. The coasting controller is configured to operate the vehicle in a coasting mode during which fuel to the engine of the vehicle is cut-off and a driveline of the vehicle is disengaged from the engine while the vehicle coasts; determine the coasting mode is to be terminated; couple the engine to the driveline and re-initiate fueling of the engine to increase the speed of the engine; and re-engage the driveline to the engine in response to the speed of the engine reaching a desired operating speed.

In an embodiment, the coasting controller is configured to increase the speed of the engine by initiating closing a clutch between the driveline and the engine. In a refinement of this embodiment, the coasting controller is configured to initiate closing the clutch before fueling to the engine is re-initiated.

In yet a further refinement of the above embodiment, the coasting controller is configured to re-initiate fueling to the engine during closing the clutch. In yet a further refinement, the coasting controller is configured to re-initiate fueling to the engine response to the speed of the engine increasing to a speed threshold less than the desired operating speed.

In still a further refinement, the coasting controller is configured to re-open the clutch before fueling to the engine is re-initiated, and then re-initiate fueling to the engine while the clutch is re-opened. In a further refinement, the coasting controller is configured to re-open the clutch in response to the speed of the engine increasing to a first threshold less than the desired operating speed. In yet a further refinement, the coasting controller is configured to re-close the clutch in response to the speed of the engine achieving a second threshold greater than the first threshold via fueling re-initiated to the engine. In a further refinement, the second threshold approximates the desired operating speed.

It should be understood that while the use of words such as preferable, preferably, preferred or more preferred if utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
operating a vehicle in a coasting mode during which fuel to an engine of the vehicle is cut-off and a driveline of the vehicle is disengaged from the engine while the vehicle coasts;
determining the coasting mode of operation of the vehicle is to be terminated;
in response to the determining, selecting an engine re-start mode that increases a speed of the engine by coupling the engine to the driveline, wherein the engine re-start mode includes initiating closing a clutch between the driveline and the engine before re-initiating fueling to the engine and re-initiating fueling to the engine during closing the clutch in response to the speed of the engine increasing to a speed threshold less than a desired operating speed; and
re-engaging the driveline to the engine in response to the speed of the engine being increased to the desired operating speed.

2. A method comprising:
operating a vehicle in a coasting mode during which fuel to an engine of the vehicle is cut-off and a driveline of the vehicle is disengaged from the engine while the vehicle coasts;
determining the coasting mode of operation of the vehicle is to be terminated;
in response to the determining, selecting an engine re-start mode that increases a speed of the engine by coupling the engine to the driveline, wherein the engine re-start mode includes initiating closing a clutch between the driveline and the engine, then re-opening the clutch before re-initiating fueling to the engine, and then re-initiating fueling to the engine while the clutch is re-opened; and
re-engaging the driveline to the engine in response to the speed of the engine being increased to a desired operating speed.

3. The method of claim 2, wherein the clutch is re-opened in response to the speed of the engine increasing to a first threshold less than the desired operating speed.

4. The method of claim 3, further comprising re-closing the clutch in response to the speed of the engine achieving a second threshold greater than the first threshold via fueling to the engine.

5. The method of claim 4, wherein the second threshold approximates the desired operating speed.

6. The method of claim 1, wherein in response to determining the coasting mode of operation of the vehicle is to be terminated, first selecting a different engine re-start mode that increases the speed of the engine by engaging a starter to increase the speed of the engine to a first threshold before re-initiating fueling the engine, and then disengaging the starter in response to the speed of the engine reaching the first threshold and then selecting the engine re-start mode that increases the speed of the engine by coupling the engine to the driveline.

7. The method of claim 6, further comprising closing the clutch after increasing the speed of the engine to a second threshold greater than the first threshold via re-initiating fueling to the engine.

8. An apparatus comprising:
a coasting controller for a vehicle having an engine structured to provide motive power to the vehicle, wherein the coasting controller is configured to:
operate the vehicle in a coasting mode during which fuel to the engine of the vehicle is cut-off and a driveline of the vehicle is disengaged from the engine while the vehicle coasts;
determine the coasting mode is to be terminated;
select an engine re-start mode that couples the engine to the driveline, wherein the engine re-start mode includes initiating closing a clutch between the driveline and the engine to increase a speed of the engine before and re-initiating fueling of the engine and re-initiating fueling to the engine during closing the clutch in response to the speed of the engine increasing to a speed threshold less than a desired operating speed; and re-engage the driveline to the engine in response to the speed of the engine reaching a desired operating speed.

9. An apparatus comprising:
a coasting controller for a vehicle having an engine structured to provide motive power to the vehicle, wherein the coasting controller is configured to:
  operate the vehicle in a coasting mode during which fuel to the engine of the vehicle is cut-off and a driveline of the vehicle is disengaged from the engine while the vehicle coasts;
  determine the coasting mode is to be terminated;
  select an engine re-start mode that couples the engine to the driveline, wherein the engine re-start mode includes initiating closing a clutch between the driveline and the engine to increase a speed of the engine, re-opening the clutch before fueling to the engine is re-initiated, and then re-initiate fueling to the engine while the clutch is re-opened; and
  re-engage the driveline to the engine in response to the speed of the engine reaching a desired operating speed.

10. The apparatus of claim 9, wherein the coasting controller is configured to re-open the clutch in response to the speed of the engine increasing to a first threshold less than the desired operating speed.

11. The apparatus of claim 10, wherein the coasting controller is configured to re-close the clutch in response to the speed of the engine achieving a second threshold greater than the first threshold via fueling re-initiated to the engine.

12. The apparatus of claim 11, wherein the second threshold approximates the desired operating speed.

* * * * *